US012682446B2

(12) United States Patent
Jeung et al.

(10) Patent No.: US 12,682,446 B2
(45) Date of Patent: Jul. 14, 2026

(54) NON-DESTRUCTIVE WIRE BONDING INSPECTION METHOD

(71) Applicant: LG Energy Solution, Ltd., Seoul (KR)

(72) Inventors: Seok Won Jeung, Daejeon (KR); Hyun Min Oh, Daejeon (KR); Geon Tae Park, Daejeon (KR); Choon Kwon Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 268 days.

(21) Appl. No.: 18/278,867

(22) PCT Filed: Jul. 25, 2022

(86) PCT No.: PCT/KR2022/010902
§ 371 (c)(1),
(2) Date: Aug. 25, 2023

(87) PCT Pub. No.: WO2023/022383
PCT Pub. Date: Feb. 23, 2023

(65) Prior Publication Data
US 2024/0265522 A1     Aug. 8, 2024

(30) Foreign Application Priority Data

Aug. 18, 2021     (KR) ........................ 10-2021-0108421

(51) Int. Cl.
*G06T 7/00*       (2017.01)
*G06T 7/62*       (2017.01)
*H01M 50/516*     (2021.01)

(52) U.S. Cl.
CPC ................ G06T 7/001 (2013.01); G06T 7/62 (2017.01); *G06T 2207/30108* (2013.01); *H01M 50/516* (2021.01)

(58) Field of Classification Search
CPC ....... G01N 2021/8887; G01N 21/8851; G01N 21/95; G01N 21/956; G06T 2207/30108;
(Continued)

(56) References Cited

U.S. PATENT DOCUMENTS 6,330,354 B1 * 12/2001 Companion ............ G06T 7/001
382/150
2006/0018531 A1 * 1/2006 Murakami .............. G06T 7/254
382/145
2013/0006565 A1   1/2013 Matsumoto

FOREIGN PATENT DOCUMENTS

CN          104020222 A      9/2014
CN          109813727 A      5/2019
(Continued)

OTHER PUBLICATIONS

Schneider-Ramelow, Martin, et al. "Development and status of Cu ball/wedge bonding in 2012." Journal of electronic materials 42.3 (2013): 558-595. (Year: 2013).*
(Continued)

*Primary Examiner* — Chineyere Wills-Burns
*Assistant Examiner* — Emmanuel Silva-Avina
(74) *Attorney, Agent, or Firm* — Lerner David LLP

(57)                   ABSTRACT
A non-destructive wire bonding inspection method is provided to inspect whether a wire bonding applied to a battery system is defective. The method includes a) photographing a wire bonding portion using a camera, b) calculating the area of the wire bonding portion, and c) determining whether the wire bonding is defective based on the calculated area of the wire bonding portion.

10 Claims, 1 Drawing Sheet

(58) Field of Classification Search

CPC ......... G06T 7/001; G06T 7/0006; G06T 7/62;
G06T 2207/30152; G06T 2207/30148;
H01M 50/516; G01B 11/285

USPC ....................................................... 382/141

See application file for complete search history.

(56) References Cited

FOREIGN PATENT DOCUMENTS

| | | |
|---|---|---|
| JP | H06174442 A | 6/1994 |
| JP | H07169815 A | 7/1995 |
| JP | H08111445 A | 4/1996 |
| JP | 2000221016 A | 8/2000 |
| JP | 2002033356 A | 1/2002 |
| JP | 2010236976 A | 10/2010 |
| JP | 2011029275 A | 2/2011 |
| JP | 4991893 B2 | 8/2012 |
| KR | 90-0010383 A | 7/1990 |
| KR | 100313092 B1 | 11/2001 |
| KR | 20040044223 A | 5/2004 |
| KR | 20060097428 A | 9/2006 |
| KR | 101305255 B1 | 9/2013 |
| KR | 20150033268 A | 4/2015 |
| KR | 20210023296 A * 3/2021 .......... H01M 10/425 |

OTHER PUBLICATIONS

Khotanzad, Alireza, Haimanti Banerjee, and Mandyam D. Srinath. "A vision system for inspection of ball bonds and 2-D profile of bonding wires in integrated circuits." IEEE transactions on semiconductor manufacturing 7.4 (2002): 413-422. (Year: 2002).*

Extended European Search Report including Written Opinion for Application No. 22858622.8 dated Sep. 25, 2024, pp. 1-7.

International Search Report for PCT/KR2022/010902 mailed Nov. 2, 2022. 3 pages.

Search Report dated Jan. 30, 2026 from the Office Action for Chinese Application No. 202280018153.1 issued Feb. 3, 2026, 2 pages.

* cited by examiner

【FIG. 1】
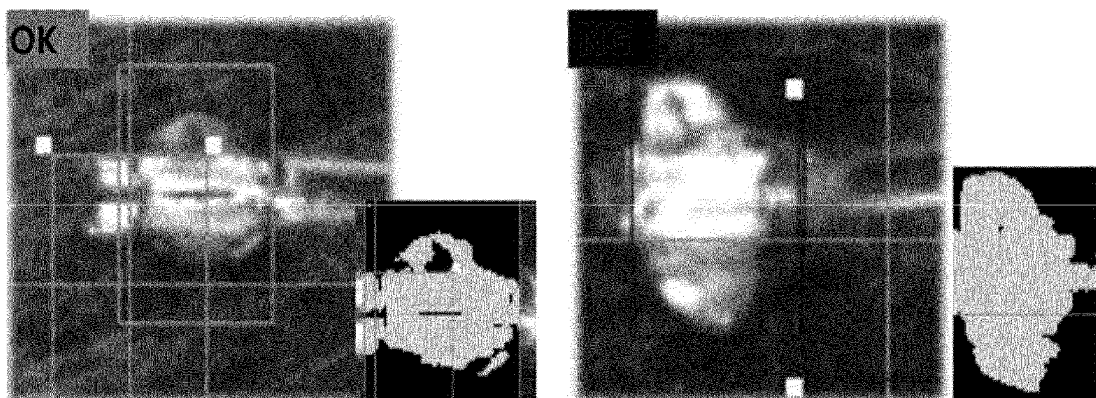
【FIG. 2】
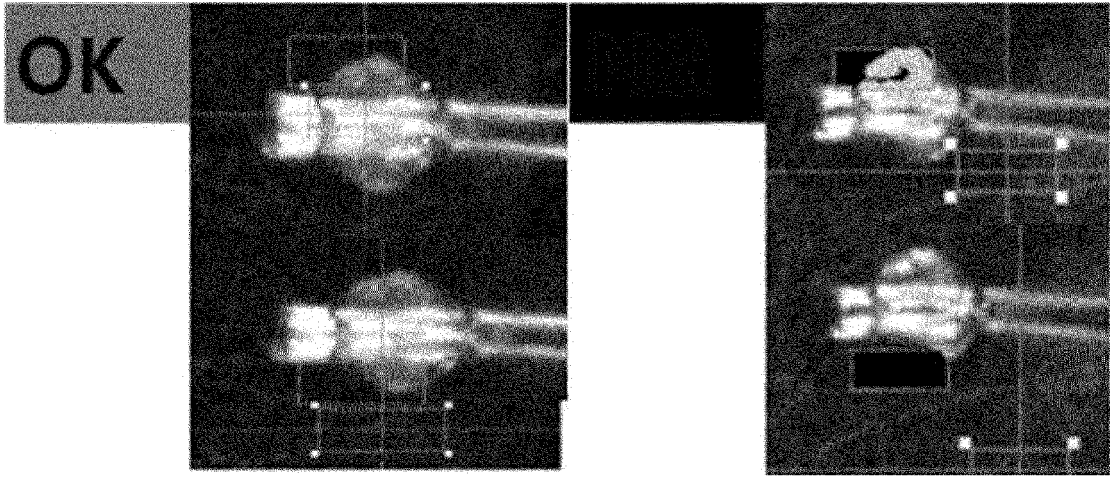

NON-DESTRUCTIVE WIRE BONDING INSPECTION METHOD

CROSS-REFERENCE TO RELATED APPLICATIONS

This application is a national stage entry under 35 U.S.C. § 371 of International Application No. PCT/KR2022/010902 filed on Jul. 25, 2022, which claims priority from Korean Patent Application No. 10-2021-0108421 filed on Aug. 18, 2021, the disclosures of which are incorporated herein by reference in their entireties.

TECHNICAL FIELD

The present disclosure relates to a non-destructive method of inspecting whether wire bonding applied to a battery system is defective.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel-cadmium battery, a nickel-hydride battery, and a nickel-zinc battery as secondary batteries that are widely used at present. The operating voltage of a unit secondary battery cell, i.e. a unit battery cell, is about 2.0V to 5.0V. When output voltage higher than the above operating voltage is required, therefore, a plurality of battery cells may be connected to each other in series to constitute a cell module assembly. In addition, cell module assemblies may be connected to each other in series or in parallel to constitute a battery module depending on required output voltage or charge and discharge capacities. In general, a battery pack is manufactured using at least one battery module by adding an additional component.

When a battery system, such as a battery module or a battery pack, is manufactured using a plurality of battery cells, as described above, electrical connection between the battery cells or between the battery cell and a component, such as a busbar, is required.

Wire bonding is used as one method for electrical connection. If the wire bonding is defective, the entirety of the battery system may fail afterwards, and therefore a process of inspecting whether the wire bonding is defective after wire bonding is performed is important.

Conventionally, a pulling inspection method to pull a bonding portion in order to measure tensile strength thereof is mainly used. Since the pulling inspection method is a method that destroys a wire bonding portion, however, only some manufactured products are sampled for inspection, and it is not possible to accurately detect underbonding.

Meanwhile, gold (Au), aluminum (Al), or copper (Cu) is used for wire bonding. Thereamong, gold wire is mainly used in a semiconductor process, and aluminum (Al) or copper (Cu) is used as the material for wire bonding used in a battery system.

In addition, various methods, such as a thermal pressing method, an ultrasonic method, and a thermal ultrasonic method, are used as the wire bonding method.

In particular, there is a difference in that gold ball wire bonding using the thermal ultrasonic method is mainly used in the semiconductor process and a method of bonding an aluminum wire or a copper wire using ultrasonic waves is mainly used in the battery system.

Since there is a difference between the battery system and the semiconductor process in terms of shape or area of the bonding portion, therefore, a bonding portion detect inspection method different from in the semiconductor process is required.

DISCLOSURE

Technical Problem

The present disclosure has been made in view of the above problems, and it is an object of the present disclosure to provide a method of inspecting whether a wire bonding is defective using a non-destructive method of photographing a bonding portion, calculating the area of the bonding portion, and performing a comparison.

Technical Solution

A wire bonding inspection method according to the present disclosure to accomplish the above object is a non-destructive method of inspecting whether a wire bonding applied to a battery system is defective, the wire bonding inspection method including a) photographing a bonding portion using a camera, b) calculating the area of the bonding portion, and c) determining whether the wire bonding is defective based on the calculated area of the bonding portion.

Also, in the wire bonding inspection method according to the present disclosure, in step b), the calculating may include using the difference in brightness between the photographed bonding portion and a peripheral portion.

Also, in the wire bonding inspection method according to the present disclosure, step b) may include comparing the area of the bonding portion with the area of a wire before bonding to calculate the relative area (%) of the bonding portion to the area of the wire before bonding.

Also, in the wire bonding inspection method according to the present disclosure, step c) may include c-1) comparing the relative area of the bonding portion with relative area data of a normal bonding portion to determine whether the wire bonding is defective.

Also, in the wire bonding inspection method according to the present disclosure, the relative area data of the normal bonding portion may be cumulative data of relative areas calculated from a plurality of bonding portions determined to be normal as the result of inspection using a conventional inspection method.

Also, in the wire bonding inspection method according to the present disclosure, step c) may further include c-2) comparing the left and right areas of the bonding portion with each other based on the center thereof and determining whether the degree of symmetry between the left and right areas is within an allowable range in order to determine whether the wire bonding is defective.

Also, in the wire bonding inspection method according to the present disclosure, the allowable range may be cumulative data of left-right symmetries calculated from a plurality of bonding portions determined to be normal as the result of inspection using a conventional inspection method.

Also, in the wire bonding inspection method according to the present disclosure, in step c), the determining may include making a determination that the wire bonding is defective when a determination is made in at least one of step c-1) or step c-2) that the wire bonding is defective.

In addition, a battery system according to the present disclosure includes the wire inspected according to any one of the wire bonding inspection methods according to the present disclosure.

In addition, a device according to the present disclosure includes the battery system according to the present disclosure.

Advantageous Effects

A wire bonding inspection method according to the present disclosure has an advantage in that the wire bonding inspection method is a non-destructive method using ultrasonic waves, whereby it is possible to inspect a wire bonding portion applied to a battery system without damage thereto.

In addition, the wire bonding inspection method according to the present disclosure has an advantage in that it is possible to easily detect defects due to underbonding, which is difficult to detect using a conventional inspection method.

DESCRIPTION OF DRAWINGS

FIG. 1 is a photograph showing a wire bonding portion determined to be defective or not using a relative area comparison method according to one or more embodiments of the present invention.

FIG. 2 is a photograph showing a wire bonding portion determined to be defective or not using a method of comparing the degree of symmetry between left and right areas of the bonding portion according to one or more embodiments of the present invention.

DETAILED DESCRIPTION

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a wire bonding inspection method according to the present disclosure will be described with reference to the accompanying drawings.

The wire bonding inspection method according to the present disclosure is a method of inspecting whether a wire bonding is defective using a non-destructive inspection method.

Specifically, the wire bonding inspection method may include a step of photographing a wire bonding portion to be inspected using a camera, a step of calculating the area of the photographed bonding portion, and a step of determining whether a wire bonding is defective based on the calculated area of the bonding portion.

FIG. 1 is a photograph showing a wire bonding portion determined to be defective or not using a relative area comparison method according to one or more embodiments of the present invention.

When describing the inspection method for each step with reference to FIG. 1, first, the step of photographing the wire bonding portion using the camera is a step of performing photographing using a known photographing means, such as a CCD camera. As shown in FIG. 1, a wire and the wire bonding portion appear bright, and a peripheral portion thereof appears dark.

The step of calculating the area of the photographed bonding portion includes a step of calculating the area of the bonding portion from the difference in brightness between the bonding portion and the peripheral portion using a black and white algorithm based on the photographing result as shown in FIG. 1 and comparing the calculated area of the bonding portion with the area of the wire before bonding to calculate a relative area (%).

Next, the step of determining whether the wire bonding is defective based on the calculated area of the bonding portion includes a step of comparing the relative area of the bonding portion with cumulative data of relative area calculated from a plurality of bonding portions determined to be normal as the result of inspection using a conventional inspection method.

The range of the relative area of the cumulative data calculated from the plurality of bonding portions determined to be normal as the result of inspection using the conventional inspection method is about 140 to 200%.

That is, as shown in FIG. 1, when the relative area of the bonding portion is within 140 and 200%, a determination may be made that the bonding portion is normal, and when the relative area of the bonding portion is less than 140% or greater than 200%, a determination may be made that the bonding portion is defective. Specifically, when the relative area of the bonding portion is less than 140%, a determination may be made that the bonding portion is defective due to underbonding, and when the relative area of the bonding portion is greater than 200%, a determination may be made that the bonding portion is defective due to overbonding.

However, there may be a case in which it is not possible to accurately detect defects of the wire bonding through only such comparison in relative area. For more accurate detect determination, therefore, it is preferable for an additional defect determination step to be included in addition to the above step.

In the present disclosure, therefore, the step of determining whether the wire bonding is defective may further include a step of comparing left and right areas of the bonding portion based on the center thereof with each other and determining whether the degree of symmetry between the left and right areas is within an allowable range in order to determine whether the wire bonding is defective, in addition to the step of comparing the relative area of the bonding portion with relative area data of normal bonding portions to determine whether the bonding portion is defective.

FIG. 2 is a photograph showing a wire bonding portion determined to be defective or not using a method of comparing the degree of symmetry between left and right areas of the bonding portion according to one or more embodiments of the present invention.

When describing the step of determining whether the bonding portion is defective using the method of comparing the degree of symmetry between the left and right areas of the bonding portion with reference to FIG. 2, for example, even though the relative area of the bonding portion satisfies a range of 140 to 200%, there may be a difference in degree of symmetry between the left and right areas of the bonding portion based on the center thereof, as shown in FIG. 2.

When there is a difference in degree of symmetry between the left and right areas of the wire bonding portion as the result of comparing the wire bonding portion determined to be defective with wire bonding portions determined to be normal using the conventional inspection method, it is possible to determine whether the wire bonding is defective therethrough.

Specifically, when the difference between the left and right relative areas calculated from a plurality of bonding portions determined to be normal is within 20%, this is an allowable range considered to be indicative of normal bonding.

That is, when the difference between the left and right relative areas of the bonding portion exceeds 20% even though the relative area of the bonding portion satisfies a range of 140 to 200%, a determination may be made that the bonding portion is defective.

Consequently, the step of determining whether the wire bonding is defective may include the step of comparing the degree of left-right symmetry of the bonding portion as well as the step of determining whether the relative area range is a normal range through comparison, described above, whereby it is possible to determine whether the wire bonding portion is defective with higher accuracy.

When it is determined in any one of the two steps that the wire bonding portion is defective, a determination is made that the wire bonding portion is defective.

Of course, although there is a difference, compared to when both the step of comparing the relative area ranges with each other and the step of comparing the degree of left-right symmetry is used, it is possible to determine whether the wire bonding is defective using only one of the two steps depending on circumstances.

In addition, the sequence in which the two steps are performed is not particularly restricted. The step of determining whether the bonding portion is defective by comparing the degree of symmetry between the left and right areas of the bonding portion may be performed first, or the two steps may be simultaneously performed.

Meanwhile, since the wire bonding inspection method according to the present disclosure is a non-destructive method, a battery system with respect to which wire bonding inspection has been performed may be used in various kinds of devices, such as an electric vehicle (EV), a hybrid electric vehicle (HEV), a plug-in hybrid electric vehicle (P-HEV), and an energy storage system (ESS).

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

The invention claimed is:

1. A non-destructive wire bonding inspection method to inspect whether a wire bonding applied to a battery system is defective, comprising:
    a) photographing a bonding portion using a CCD camera;
    b) calculating an area of the bonding portion; and
    c) determining whether the wire bonding is defective based on the calculated area of the bonding portion,
    wherein the calculating comprises comparing the area of the bonding portion with an area of a wire before bonding to calculate a relative area percentage of the bonding portion to the area of the wire before bonding, and
    wherein the determining calculates the relative area percentage by comparing the area of the bonding portion, which is calculated from a difference in brightness between the photographed bonding portion and a peripheral portion, with the area of the wire before bonding, and determines whether the wire bonding is defective by comparing the calculated relative area percentage with cumulative data of relative areas calculated from a plurality of bonding portions determined to be normal.

2. The non-destructive wire bonding inspection method according to claim 1, wherein the calculating comprises using a difference in brightness between the photographed bonding portion and a peripheral portion.

3. The non-destructive wire bonding inspection method according to claim 1, wherein the determining comprises c-1) comparing the relative area percentage of the bonding portion with relative area data of a normal bonding portion to determine whether the wire bonding is defective.

4. The non-destructive wire bonding inspection method according to claim 3, wherein the relative area data of the normal bonding portion are cumulative data of relative areas calculated from the plurality of bonding portions determined to be normal as a result of inspection using a conventional inspection method.

5. The non-destructive wire bonding inspection method according to claim 3, wherein the determining further comprises c-2) comparing left and right areas of the bonding portion with each other based on a center thereof and determining whether a degree of symmetry between the left and right areas is within an allowable range in order to determine whether the wire bonding is defective.

6. The wire bonding inspection method according to claim 5, wherein the allowable range is cumulative data of left-right symmetries calculated from a plurality of bonding portions determined to be normal as a result of inspection using a conventional inspection method.

7. The non-destructive wire bonding inspection method according to claim 5, wherein the determining comprises making a determination that the wire bonding is defective when a determination is made in at least one of c-1) or c-2) that the wire bonding is defective.

8. A battery system comprising the wire bonding inspected according to the non-destructive wire bonding inspection method of claim 1.

9. A device comprising the battery system according to claim 8.

10. A non-destructive wire bonding inspection method to inspect whether a wire bonding applied to a battery system is defective, comprising:
    a) photographing a bonding portion using a CCD camera;
    b) calculating an area of the bonding portion; and
    c) determining whether the wire bonding is defective based on the calculated area of the bonding portion, wherein the calculating comprises comparing the area of the bonding portion with an area of a wire before bonding to calculate a relative area percentage of the bonding portion to the area of the wire before bonding, and wherein when the relative area percentage of the bonding portion ranges from 140% and 200%, the bonding portion is normal, and when the relative area percentage of the bonding portion is less than 140% or greater than 200%, the bonding portion is defective.

\* \* \* \* \*